United States Patent
Bauerle

(10) Patent No.: US 10,252,711 B2
(45) Date of Patent: Apr. 9, 2019

(54) SYSTEMS AND METHODS FOR DESTINATION BASED ENERGY MANAGEMENT

(71) Applicant: GM GLOBAL TECHNOLOGY OPERATIONS LLC, Detroit, MI (US)

(72) Inventor: Paul A. Bauerle, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 252 days.

(21) Appl. No.: 15/340,062

(22) Filed: Nov. 1, 2016

(65) Prior Publication Data

US 2018/0118188 A1    May 3, 2018

(51) Int. Cl.
*B60W 20/12* (2016.01)
*B60H 1/00* (2006.01)
*B60R 16/023* (2006.01)
*B60W 10/06* (2006.01)
*B60W 10/30* (2006.01)
*G01S 19/13* (2010.01)
*B60R 16/03* (2006.01)

(52) U.S. Cl.
CPC ......... *B60W 20/12* (2016.01); *B60H 1/00964* (2013.01); *B60R 16/0236* (2013.01); *B60W 10/06* (2013.01); *B60W 10/30* (2013.01); *B60R 16/03* (2013.01); *B60W 2510/244* (2013.01); *B60W 2550/12* (2013.01); *B60W 2710/06* (2013.01); *B60W 2710/30* (2013.01); *G01S 19/13* (2013.01); *Y02T 10/7005* (2013.01); *Y02T 10/84* (2013.01); *Y02T 90/14* (2013.01)

(58) Field of Classification Search
CPC ...... B60W 20/12; B60W 10/06; B60W 10/30; B60W 2510/244; B60W 2550/12; B60W 2710/06; B60W 2710/30; B60H 1/00964; B60R 16/0236; G01S 19/13
See application file for complete search history.

(56) References Cited

U.S. PATENT DOCUMENTS

| | | | | |
|---|---|---|---|---|
| 2012/0158241 | A1* | 6/2012 | Tate, Jr. | B60H 1/00392 701/36 |
| 2014/0277869 | A1* | 9/2014 | King | B60H 1/00278 701/22 |
| 2015/0123470 | A1* | 5/2015 | Moore | B60R 16/03 307/10.1 |
| 2016/0280213 | A1* | 9/2016 | Lian | B60W 20/13 |
| 2017/0113511 | A1* | 4/2017 | Khafagy | B60H 1/00007 |
| 2017/0144563 | A1* | 5/2017 | Lim | B60L 11/1862 |

* cited by examiner

*Primary Examiner* — Rachid Bendidi
(74) *Attorney, Agent, or Firm* — Lorenz & Kopf, LLP

(57) ABSTRACT

A system and method are provided for destination based energy management for a mobile platform. The provided system and method customize energy management based on user driving habits. The provided system and method for energy management leverage available mobile platform GPS data and control auxiliary mobile platform systems based on user supplied destinations.

11 Claims, 2 Drawing Sheets

SYSTEMS AND METHODS FOR DESTINATION BASED ENERGY MANAGEMENT

TECHNICAL FIELD

The technical field generally relates to mobile platform management systems, and specifically relates to systems and related operating methods for destination based energy management for a vehicle.

BACKGROUND

Energy consumption is a central issue in the evolution of mobile platforms. Reducing energy consumption enables a mobile platform to operate longer on an energy source. In order to reduce energy consumption, a variety of approaches may be employed. A first approach is to reduce overall weight and/or increase component efficiency. Another approach is to employ one or more energy management techniques. In one energy management technique, a mobile platform in the form of a plug-in hybrid electric vehicle (PHEV) may switch the energy source between a battery and a traditional engine in accordance with an operational protocol. As energy consumption continues to be a central issue in mobile platform designs, systems and methods that further reduce energy consumption are desirable.

Accordingly, a system and method capable of customizing energy management based on user supplied destinations and driving habits are desirable. Furthermore, other desirable features and characteristics of the present invention will be apparent from the subsequent detailed description and the appended claims, taken in conjunction with the accompanying drawings and the foregoing technical field and background.

SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

An energy management method for a mobile platform is provided. The method comprising: receiving, by an energy management module, a geographic destination for the mobile platform; receiving, by the energy management module, a user preference cabin temperature; receiving, from a sensor coupled to the energy management module, an external temperature; receiving, from an auto-start system, battery information for a battery associated with the mobile platform; generating, by the energy management module, a mileage threshold based on the user preference cabin temperature, the external temperature, the battery information, and the destination; and generating a command for an auxiliary mobile platform system coupled to the energy management module when a geographic position of the mobile platform equals the mileage threshold.

Also provided is an energy management module for a mobile platform, the module comprising: a memory device; and a processor coupled to the memory device, an auto-start system, a user input device, a sensor system, and a geographic position system (GPS), the processor configured to, receive a geographic destination for the mobile platform, receive a user preference cabin temperature, receive an external temperature, receive battery information, generate a mileage threshold based on the user preference cabin temperature, the external temperature, the destination, a sensed cabin temperature, and the battery information, monitor a position of the mobile platform, and generate a command for an auxiliary mobile platform system when a geographic position of the mobile platform reaches the mileage threshold.

In addition, an energy management system for a mobile platform is provided. The system comprising: an auto-start system coupled to a battery; a climate control device; a geographic position system (GPS); an energy management module coupled to the auto-start system, the climate control device, the geographic position system (GPS), and a user input device, the energy management module configured to, receive a user preference cabin temperature, receive an external temperature from a sensor system, receive a geographic destination for the mobile platform via a user input device, receive battery information, generate a mileage threshold based on the user preference cabin temperature, the external temperature, the destination, a sensed cabin temperature, and the battery information, and generate a command for the auto-start system or the climate control device when a geographic position of the mobile platform equals the mileage threshold.

Other desired features will become apparent from the following detailed description and the appended claims, taken in conjunction with the accompanying drawings and this background.

DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

Figure 1:
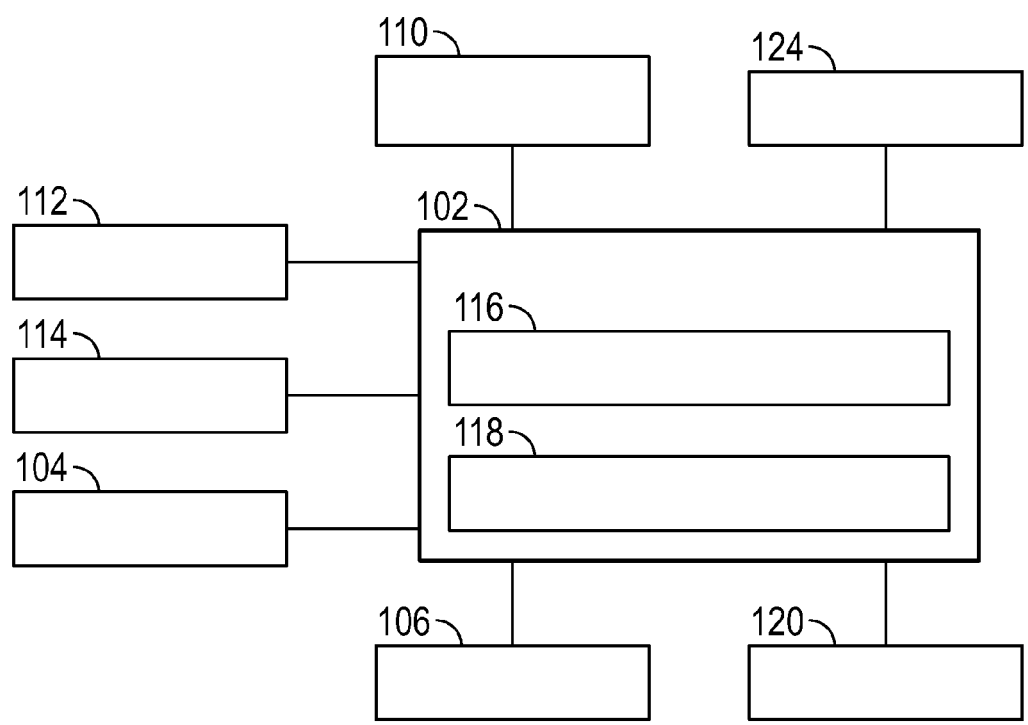
FIG. 1 is a functional block diagram illustrating a destination based energy management system, in accordance with various exemplary embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to an application specific integrated circuit (ASIC), an electronic circuit, a processor (shared, dedicated, or group) and/or memory that executes or stores one or more software or firmware programs, a combinational logic circuit, and/or other suitable components that provide the described functionality. As used herein, the word "exemplary" means "serving as an example, instance, or illustration." Any implementation described herein as exemplary is not necessarily to be construed as preferred or advantageous over any other implementations. Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented.

In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to transmitting and receiving signals, wireless communication modules, wireless transceivers, network interfaces, and other functional aspects of certain systems and subsystems (and the individual operating components thereof) may not be described in detail herein. In addition, certain terminology may also be used in the following description for the purpose of reference only. Accordingly, the examples presented herein are intended as non-limiting.

As an overview, the provided energy management system is a destination based energy management system that leverages available mobile platform GPS data and controls auxiliary mobile platform systems based on a user supplied destination. The provided energy management system employs an energy management module that is customizable, in that it may learn user driving and operating habits, such as preferred cabin temperatures and frequent destinations (for example, work and home). Energy consumption is managed by controlling the operation of one or more auxiliary mobile platform systems, based on the user supplied destination. Non-limiting examples of the control include turning a climate control device off and suspending the charging of an on-board battery. Additionally, the provided energy management module allows the user to override its control, and to modify future controls responsive to received user overrides. Over time, the energy management system may increasingly customize to the user, thereby reducing overall energy consumption by the mobile platform without adversely affecting user driving preferences.

Auxiliary mobile platform systems that may be controlled by the provided energy management module include heaters, air conditioners, and heating, ventilation and air conditioning systems (HVAC). Turning off a HVAC system at a predetermined remaining distance to the destination is a destination based energy management technique that reduces overall energy consumption, and it provides additional advantages. Turning off a HVAC system prior to the destination provides an opportunity for the HVAC to dry out prior to reaching the destination. When the HVAC is dried out prior to reaching the destination, (i) the HVAC may not drip water at the destination, such as on a garage floor, and (ii) the HVAC, when subsequently turned on, may not emit the musty smell often associated with turning the HVAC on.

Another auxiliary mobile platform system that may be controlled by the provided energy management module is an auto-start system 112, found in mobile platforms such as plug-in hybrid electric vehicles (PHEV), wherein energy may be further managed by controlling the timing of charging the battery based on the user supplied destination. As a simplified overview, an auto-start system 112 works as follows. When a PHEV is operating using electric power from the battery 114, the charge of the battery 114 is decreasing as the PHEV travels. The design of a mobile platform management system of a PHEV often has a procedure for determining when to charge the battery 114. One such procedure is to identify, for the battery 114, a predicted distance (for example, a number of miles) that can be traveled on the fully charged battery before the battery must be charged again, and, when the distance is reached, the engine is turned on to charge the battery 114. As used herein, "auto-start" the battery means turning on the engine (not shown) and charging the battery from the engine, and an "auto-start trigger" means a request to "auto-start" the battery.

The auto-start system 112 generally auto-starts the battery 114 in prompt response to an auto-start trigger. The auto-start trigger may be generated internal to the auto-start system 112, or received from an existing platform management system (not shown). In contrast, the provided destination based energy management module manages energy consumption of the auto-start system 112 as follows. In response to an auto-start trigger, the provided energy management module (i) determines a safety margin for the battery, which is a distance (for example, a number of miles) that the mobile platform is predicted to safely travel on the battery after the auto-start trigger is received, and before the charge of the battery decreases to a critical level, (ii) compares the safety margin to a distance remaining to the destination, and (iii) when the safety margin is larger than the distance remaining to the destination, suspends the auto-start, thereby not starting the engine so close to the destination. At the destination, the user may choose to charge the battery 114 from a different source than the mobile platform engine. In this manner, the destination based energy management module may reduce cost and overall energy usage of the mobile platform.

The above overview and below detailed description introduce a system and method for destination based energy management for a mobile platform that generate commands for one or more climate control devices and/or an auto-start system for a mobile platform battery. The provided system and method for destination based energy management may take the form of an energy management module integrated within a preexisting mobile platform management system or vehicle management system. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Although the following description realizes the mobile platform as a vehicle, the concepts presented here can be deployed in other mobile platforms, such as aircraft, spacecraft, watercraft, motorcycles, robots, robotic devices, and the like. Moreover, the concepts presented here may also be deployed in non-mobile platform applications, if so desired.

Referring now to the drawings, FIG. 1 is a simplified energy management system 100 diagram, in accordance with various exemplary embodiments. As shown in FIG. 1, the exemplary energy management system 100 includes, in various embodiments, an energy management module 102 operatively coupled to a sensor system 104, auto-start system 112, battery 114, climate control devices(s) 110, a user input device 106, and a mobile platform 120. The energy management module 102 is in operative communication with a source of geographic position information, such as the global position system (GPS) 124. In various embodiments, the mobile platform 120 comprises an engine, an audio device, relevant vehicle subsystems, and vehicle hardware.

In various embodiments, the energy management module 102 includes a memory device 118 and a processor 116 coupled together such that the processor 116 can read information from, and writes information to, the memory device 118. The software or firmware program code segments or instructions that perform the various tasks described herein can be stored in and among the memory devices. In various embodiments, the processor and memory device of the energy management module 102 may be integrated within an existing mobile platform management system within mobile platform 120.

As used herein, "memory device" 118 comprises any combination of processor-readable or computer-readable storage mediums, which can be realized in a non-transitory and tangible form. The "processor-readable medium" or "machine-readable medium" may include any medium that can store or transfer information. Examples of the processor-readable medium include an electronic circuit, a semiconductor memory device, a RAM, a ROM, a flash memory, an erasable ROM (EROM), a floppy diskette, a removable disk, a CD-ROM, an optical disk, a hard disk, In various embodiments, the memory device may be integral to a respective processor. Memory devices may store non-transitory computer readable instructions and program code for operating the energy management module 102, and various other functional or logical module/components of the components of the energy management system 100.

A global positioning system (GPS) 124 may include any combination of onboard radar and other onboard instrumentation, such as a radio altimeter, a barometric altimeter, or the like, sufficient to provide location information for the mobile platform. User preferences may be previously stored in the memory device 118 and retrieved by the energy management module 102. In an alternative, user preferences may be obtained real time by the energy management module 102 via the user input device 106.

The user input device 106 may be realized as any combination of: keypad, touchpad, keyboard, mouse, touchscreen, joystick, knob, microphone, speech recognition device, gesture interpretation device, or any device suitably adapted to receive input from a user and convert user input into signals for processing by a processor. A user may utilize the user input device 106 to perform activities such as, entering trip data (such as geographic start location, geographic destination, route preferences, and the like) and user preferences, such as a user preference cabin temperature. In addition, a user may utilize a user input device 106 to turn a climate control device 110 back on after the energy management module 102 has turned it off, effecting a user override, described in more detail hereinbelow.

Generally, the sensor system 104 comprises a variety of sensors each specifically configured to sense a different component or status and provide sensed information to processor 116. As a non-limiting example, the sensor system 104 provides external temperature, battery status information, and sensed cabin temperature to the energy management module 102. In some embodiments, the sensor system 104 provides speed and/or acceleration data to the energy management module 102.

In addition to the above described components shown in FIG. 1, the energy management module 102 is in operative communication with, and generates commands for, auxiliary mobile platform systems, such as the climate control devices 110 and an auto-start system 112, associated with an onboard battery 114. As mentioned above, the auto-start system 112 charges the battery 114 using the engine, responsive to an auto-start trigger (described in more detail below).

Figure 2:
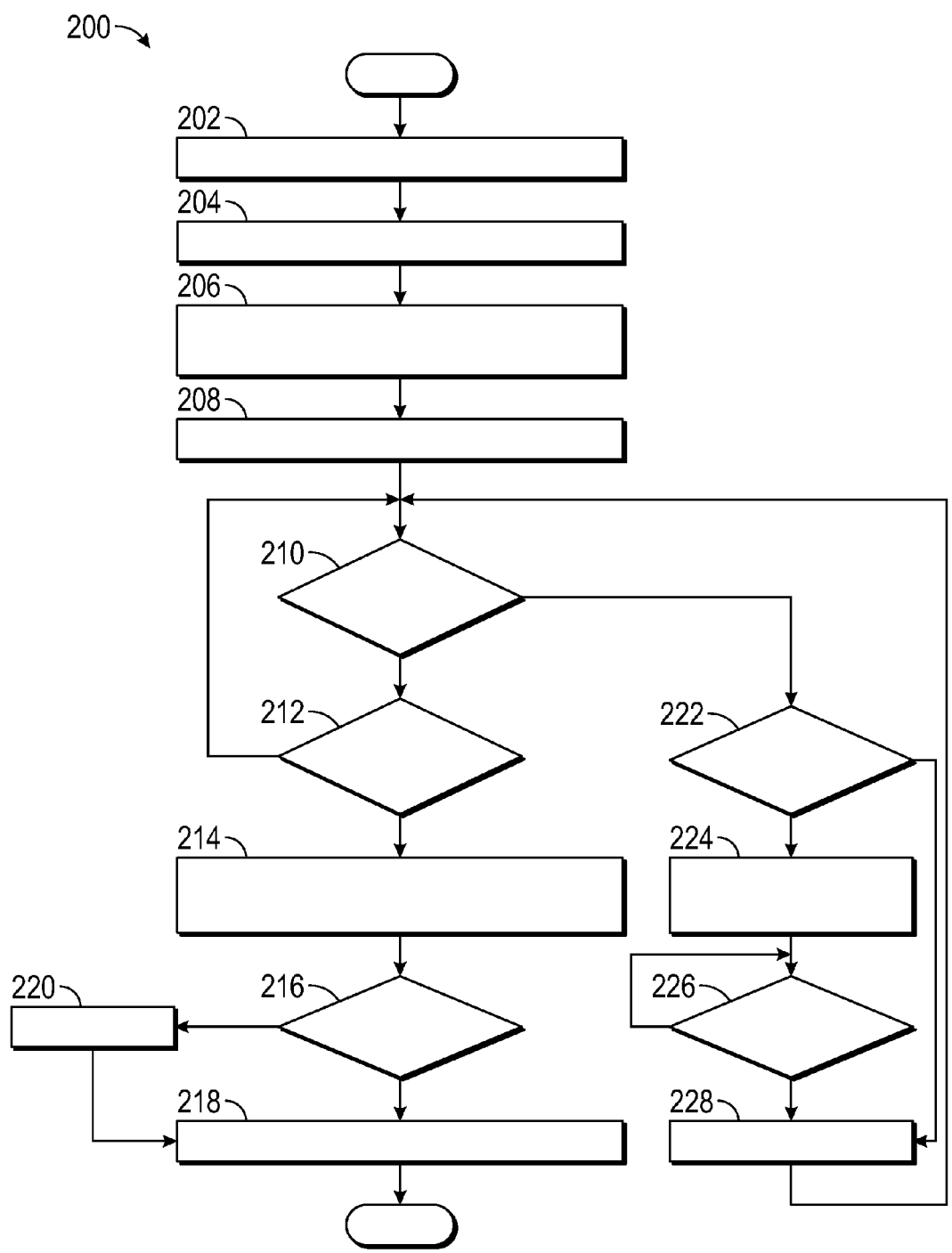
FIG. 2 is a flow chart describing a method for destination based energy management, in accordance with various exemplary embodiments.

The energy management module 102 may be implemented in any combination of software or firmware, and may employ program code segments or instructions that perform the various tasks described hereinbelow. Referring now to FIG. 2 and with continued reference to FIG. 1, a flow chart is provided for a method 200 for destination based energy management, in accordance with various exemplary embodiments. Method 200 represents various embodiments of a method associated with a destination based energy management module 102. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact.

At 202 the energy management module 102 receives, via the user input device 106, trip data comprising a geographic destination. The energy management module 102 may determine the geographic start location in reliance upon input from the GPS 124. In an alternative, at 202, the energy management module 102 may receive the geographic start location and the geographic destination. At 204, the energy management module 102 associates a travel path with the trip. While it is readily understood that more than one travel path may connect a start location and a geographic destination, as used herein, a trip comprises a geographic start location and a geographic destination connected by one travel path. Therefore, a second travel path from the geographic start location to the geographic destination is processed as a second trip, different from the first trip.

At 206, the energy management module 102 receives a user preference cabin temperature that is used to turn on a climate control device 110. The user preference cabin temperature may be provided real time, via the user input device 106, or may be retrieved from a previously stored location, such as, in the platform management system 108.

At 208, the energy management module 102 generates a mileage threshold associated with the trip. A mileage threshold comprises (i) a distance measured from the destination, and (ii) a location on the travel path. By design, so long as the vehicle adheres to the travel path, the vehicle encounters the mileage threshold prior to reaching the destination. The mileage threshold is based on the destination, user preference cabin temperature, the sensed external temperature, and battery information supplied by the auto-start system 112. The mileage threshold may be generated based additionally upon sensed cabin temperature. The energy management module 102 commands an auxiliary mobile platform system at the mileage threshold, therefore, the mileage threshold is a distance prior to the destination at which the cabin temperature may start being uncontrolled, or an auto-start may be suspended. With respect to cabin temperature, the mileage threshold represents a balance between not allowing the cabin temperature to deviate too much from the user preference cabin temperature, and turning off a climate control device 110 enough in advance of the destination to reduce energy consumption and allow the climate control device 110 to dry out. At 208, if the energy management module 102 determines that a mileage threshold was previously stored for the trip, generating the mileage threshold may comprise retrieving the previously stored mileage threshold. In some embodiments, the mileage threshold is within a range of about one to two miles.

The mobile platform 120 travels along the travel path. The energy management module 102 is configured to continually monitor a geographic position of the vehicle provided by GPS 124, as the mobile platform proceeds along the travel path. At 210, if an auto-start trigger has not been received, the method 200 compares the geographic position of the vehicle to the mileage threshold at 212.

When, at 212, the energy management module 102 determines, based on a geographic position of the mobile platform, that the mobile platform has reached the mileage threshold (i.e., when the geographic position of the vehicle equals the mileage threshold), the energy management module 102 generates a command for an auxiliary mobile platform system. At 214, the auxiliary mobile platform system comprises a climate control device 110, and method 200 commands climate control device 110 to turn off at 214. Depending upon the context, at 214, the energy management module 102 may be commanding an air conditioner to turn off or commanding a heater to turn off. Responsive thereto, at 214, the climate control device 110 is off. In an embodiment, the fan or blower associated with the climate control device 110 may still operate, and may be adjusted up or down in order to user up all of the residual heat or cold determined to be in the core of the climate control device 110. Sensor system 104 continues sensing cabin temperature.

Subsequent to the energy management module 102 commanding a climate control device 110 to turn off at 214, a user override may be received at 216. A user override comprises a user command, via the user input device 106, to turn the climate control device 110 on (i.e., back on) subsequent to 214. A user override may occur for a variety of reasons, and may indicate that the user became uncomfortable with the change in the cabin temperature. Responsive to a user override, the climate control device 110 is turned back on, and the energy management module 102 modifies (at 220) the generated mileage threshold associated with the trip based, in part, on (i) a geographic position of the vehicle when the override was received, and (ii) a sensed cabin temperature when the override was received. The final mileage threshold is either the generated mileage threshold or the modified mileage threshold. The energy management module 102 is configured to store (at 218) the trip and the final mileage threshold in the memory device 118.

At 210, if an auto-start trigger occurs or is received, the method 200 branches to 222. Generally, battery information is provided by the auto-start system 112, received by the energy management module 102, and comprises a safety margin for battery 114 and a critical level of charge for battery 114. The critical level of charge, or state of charge (SOC), is a level of depletion of battery charge at which it is urgent to charge the battery immediately. At the critical level of charge, a critical battery alert may be generated by the battery 114 or platform management system 108 and received by the energy management module 102. The safety margin comprises a distance (for example, a number of miles) that the vehicle is predicted to safely travel on the battery after the auto-start trigger is received, and before the battery charge reaches the critical level. The battery information is specific to a respective battery 114; it may originate from a battery manufacturer, be determined by an existing platform management system and transferred to an auto-start system 112, or be determined by the energy management module 102.

At 222, responsive to the auto-start trigger, the energy management module 102 processes battery information and a current geographic position of the vehicle. At 222, the mileage threshold comprises, or is further based upon, the battery safety margin. Wherein the mileage threshold comprises the battery safety margin, commanding an auxiliary mobile platform system comprises suspending the auto-start of the battery 114 by auto-start system 112 responsive to determining, subsequent to receiving the auto-start trigger, that a distance remaining in the trip is within the battery safety margin. Accordingly, at 224, the method 200 suspends an auto-start of the battery when both of the following conditions are true (1) a distance remaining in the trip is within (i.e., less than) a safety margin of the battery, and (2) a critical battery alert has not been received.

If, subsequent to suspending the auto-start at 224, the energy management module 102 receives a critical battery alert or otherwise determines that the battery is depleted to the critical battery level at 226, the energy management module 102 removes the suspension of auto-start at 228 responsive to the critical battery alert. Removing the suspension of auto-start at 228 may enable (at 228) immediate charging of the battery 114. In an alternative, removing the suspension of auto-start at 228 may place the engine into a charge sustaining mode rather than enabling immediate charging of the battery 114 by the engine. Method 200 also branches to auto-start at 228 when the energy management module 102 determines at 222 that a distance remaining in the trip is not within the safety margin. At the completion of auto-start at 228, the battery 114 is charged, the mobile platform may still be traveling, and the method 200 may branch back to the tasks performed by the energy management module 102 at 210.

Thus, a system and method capable of customizing energy management based on user habits are provided. The provided system and method for destination based energy management leverage available mobile platform GPS data and control auxiliary mobile platform systems based on a user supplied destination. The provided system and method may take the form of an energy management module integrated within a preexisting mobile platform or vehicle management system.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An energy management method for a mobile platform, the method comprising:
   receiving, by an energy management module, a geographic destination for the mobile platform;
   receiving, by the energy management module, a user preference cabin temperature;
   receiving, from a sensor coupled to the energy management module, an external temperature;
   receiving, from an auto-start system, battery information for a battery associated with the mobile platform;
   generating, by the energy management module, a mileage threshold based on the user preference cabin temperature, the external temperature, the battery information, and the destination;
   receiving, from a geographic position system (GPS), a geographic position of the mobile platform,
   continually monitoring, by the energy management module, the geographic position of the mobile platform,
   generating a command to turn off a climate control device coupled to the energy management module when the geographic position of the mobile platform equals the mileage threshold, and
   subsequent to turning off the climate control device,
   receiving, via a user input device, a user override command to turn the climate control device on, and responsive to the user override,
   modifying the mileage threshold responsive to (i) the geographic position of the mobile platform when the user override was received, and (ii) a sensed cabin temperature when the user override was received.

2. The energy management method of claim 1, wherein a trip comprises a geographic start location and the geographic destination connected by a travel path.

3. The energy management method of claim 2, and wherein the mileage threshold comprises a battery safety margin, and wherein generating a command for an auxiliary mobile platform system comprises suspending an auto-start of the battery based on the battery safety margin.

4. The energy management method of claim 3, wherein the battery information further comprises an auto-start trigger, and wherein suspending the auto-start of the battery comprises suspending the auto-start of the battery responsive to determining, subsequent to receiving the auto-start trigger, that a distance remaining in the trip is within the battery safety margin.

5. The energy management method of claim 4, further comprising:
   receiving, subsequent to suspending the auto-start of the battery, a critical battery alert; and
   removing, by the energy management module, the suspending of the auto-start of the battery, responsive to the critical battery alert.

6. An energy management module for a mobile platform, the module comprising:
   a memory device;
   a climate control device; and
   a processor coupled to the memory device, the climate control device, an auto-start system, a user input device, a sensor system, and a geographic position system (GPS), the processor configured to,
      receive a geographic destination for the mobile platform,
      receive a user preference cabin temperature,
      receive an external temperature,
      receive battery information,
      generate a mileage threshold based on the user preference cabin temperature, the external temperature, the destination, a sensed cabin temperature, and the battery information,
      monitor a position of the mobile platform,
      generate a command for an auxiliary mobile platform system when a geographic position of the mobile platform reaches the mileage threshold,
      command a climate control device to turn off when the geographic position of the mobile platform equals the mileage threshold,
      modify the mileage threshold responsive to a user override received subsequent to commanding the climate control device to turn off
      receive, via a user input device, a user override command to turn the climate control device on subsequent to it being turned off;
   and modify the mileage threshold responsive to (i) the geographic position of the mobile platform when the user override was received, and (ii) a sensed cabin temperature when the override was received.

7. The energy management module of claim 6, and wherein the mileage threshold comprises a battery safety margin, and wherein the processor is further configured to suspend an auto-start of the battery based on the battery safety margin.

8. The energy management module of claim 7, wherein the battery information further comprises an auto-start trigger, and wherein the processor is configured to suspend the auto-start of the battery based upon determining that a distance remaining in the trip is within the battery safety margin.

9. The energy management module of claim 8, further comprising:
   receiving, subsequent to suspending the auto-start of the battery, a critical battery alert; and
   removing, by the energy management module, the suspending of the auto-start of the battery, responsive to the critical battery alert.

10. An energy management system for a mobile platform, the system comprising:
    an auto-start system coupled to a battery;
    a climate control device;
    a geographic position system (GPS);
    an energy management module coupled to the auto-start system, the climate control device, the geographic position system (GPS), and a user input device, the energy management module configured to,
       receive a user preference cabin temperature,
       receive an external temperature from a sensor system,
       receive a geographic destination for the mobile platform via a user input device,
       receive battery information, generate a mileage threshold based on the user preference cabin temperature, the external temperature, the destination, a sensed cabin temperature, and the battery information, and generate a command to turn off the climate control device when the geographic position of the mobile platform equals the mileage threshold; and receive a user override command to turn the climate control device on, subsequent to turning off the climate control device; and responsive to the user override, modify the mileage threshold responsive to (i) the geographic position of the mobile platform when the user override was received, and (ii) a sensed cabin temperature when the user override was received.

11. The energy management system of claim 10, and wherein the mileage threshold further comprises a battery safety margin, and wherein the energy management module is further configured to:

command the auto-start system to suspend an auto-start of the battery based on the battery safety margin;

receive, subsequent to commanding the auto-start system to suspend the auto-start of the battery, a critical battery alert; and remove, the suspending of the auto-start of the battery, responsive to the critical battery alert.

* * * * *